United States Patent
Li et al.

(10) Patent No.: US 12,548,636 B2
(45) Date of Patent: Feb. 10, 2026

(54) NON-VOLATILE MEMORY AND ELECTRONIC DEVICE

(71) Applicant: GigaDevice Semiconductor Inc., Beijing (CN)

(72) Inventors: Jianxin Li, Beijing (CN); Ligang Chen, Beijing (CN)

(73) Assignee: GigaDevice Semiconductor Inc., Beijing (CN)

(*) Notice: Subject to any disclaimer, the term of this patent is extended or adjusted under 35 U.S.C. 154(b) by 28 days.

(21) Appl. No.: 18/539,632

(22) Filed: Dec. 14, 2023

(65) Prior Publication Data

US 2024/0312549 A1 Sep. 19, 2024

(30) Foreign Application Priority Data

Mar. 14, 2023 (CN) .......................... 202310266385.5

(51) Int. Cl.
*G11C 29/42* (2006.01)

(52) U.S. Cl.
CPC ................... *G11C 29/42* (2013.01)

(58) Field of Classification Search
CPC ................ G11C 29/38; G11C 29/42
See application file for complete search history.

(56) References Cited

U.S. PATENT DOCUMENTS

| | | | | |
|---|---|---|---|---|
| 10,078,461 | B1* | 9/2018 | Eickhoff | G06F 3/0656 |
| 2014/0122963 | A1* | 5/2014 | Motwani | H03M 13/2927 |
| | | | | 714/E11.034 |
| 2016/0034343 | A1* | 2/2016 | Yeh | G06F 11/1076 |
| | | | | 714/758 |
| 2018/0188998 | A1* | 7/2018 | Shaharabany | G06F 3/0688 |
| 2018/0357188 | A1* | 12/2018 | Brief | G06F 13/1668 |
| 2020/0065185 | A1* | 2/2020 | Mayer | G06F 11/1028 |
| 2022/0309012 | A1* | 9/2022 | Vankayala | H01L 25/0657 |
| 2022/0382464 | A1* | 12/2022 | Kim | G06F 3/0679 |
| 2024/0004751 | A1* | 1/2024 | Sforzin | G06F 11/10 |

* cited by examiner

*Primary Examiner* — Albert Decady
*Assistant Examiner* — Enamul M Kabir
(74) *Attorney, Agent, or Firm* — Thomas Horstemeyer, LLP

(57) ABSTRACT

A non-volatile memory, including n dies, where n is an integer greater than 1; at least one die of the n dies respectively receives a CRC operation execution instruction, and determines data to be verified of the at least one die according to the CRC operation execution instruction; for any die of the n dies, the die calculates a CRC code according to the data to be verified of the at least one die, to verify data to be verified of the non-volatile memory.

17 Claims, 4 Drawing Sheets

NON-VOLATILE MEMORY AND ELECTRONIC DEVICE

CROSS REFERENCE TO RELATED APPLICATIONS

The present disclosure claims priority to Chinese Patent Application No. 202310266385.5 entitled "Non-volatile memory and electronic device", filed on Mar. 14, 2023, and the entire contents of which are incorporated herein by reference.

TECHNICAL FIELD

The present disclosure relates to the technical field of memory, and particularly, to a non-volatile memory and an electronic device.

BACKGROUND

With the rapid development of storage technology, the reliability requirements for non-volatile memory are getting higher and higher.

In the related art, the data stored in the non-volatile memory with a single die can be verified through a CRC algorithm. However, since the CRC algorithm is performed sequentially, it cannot be used to verify the data stored in the non-volatile memory including a plurality of dies.

It should be noted that the information disclosed in the above background part is only for enhancing the understanding of the background of the present disclosure, and therefore may include information that does not constitute information in the related art known to those of ordinary skill in the art.

SUMMARY

According to an embodiment of the present disclosure, there is provided a non-volatile memory, including n dies, n is an integer greater than 1; at least one die of the n dies respectively receives a CRC operation execution instruction, and determines data to be verified of the at least one die according to the CRC operation execution instruction; for any die of the n dies, the die calculates a CRC code according to the data to be verified of the at least one die, to verify data to be verified of the non-volatile memory.

According to an embodiment of the present disclosure, there is provided a non-volatile memory, including n dies, where n is an integer greater than 1; at least one die of the n dies receives a CRC operation execution instruction and address information of data to be verified of the non-volatile memory, and determines whether a start address and an end address in the address information are both located on a same die; if the start address and the end address are not both located on the same die, a flag signal is generated to prompt that an address in the address information overflows.

According to an embodiment of the present disclosure, there is provided an electronic device, including any one of the non-volatile memories described above.

It is to be understood that the foregoing general description and the following detailed description are exemplary and explanatory only and do not limit the present disclosure.

BRIEF DESCRIPTION OF THE DRAWINGS

The accompanying drawings, which are incorporated in and constitute a part of the description, illustrate embodiments consistent with the present disclosure and together with the description serve to explain the principles of the present disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
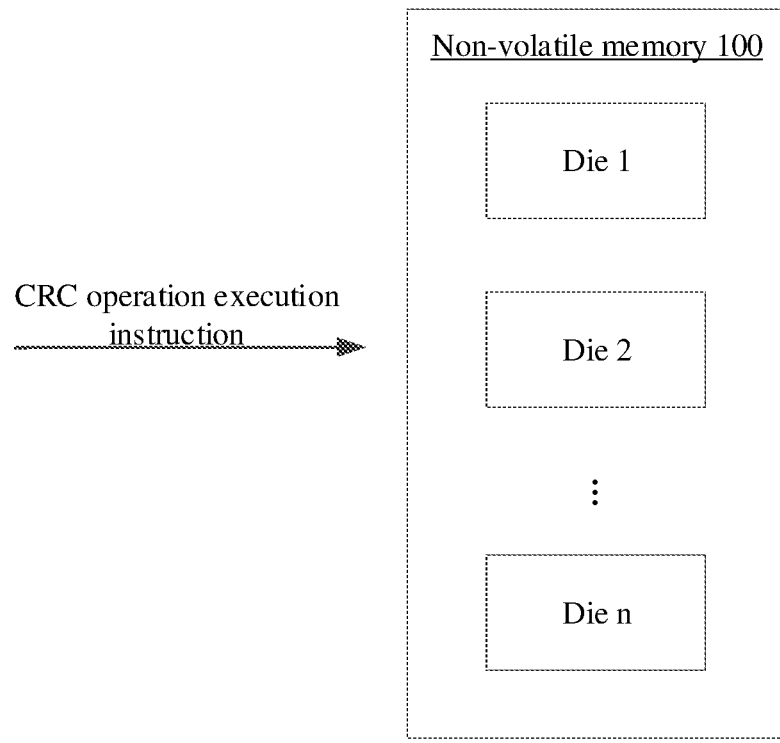
FIG. 1 is a schematic diagram of a non-volatile memory in an exemplary embodiment of the present disclosure.

Example embodiments will now be described more fully with reference to the accompanying drawings. Example embodiments, however, can be implemented in various forms and should not be construed as limited to the embodiments set forth here; by contrast, these embodiments are provided so that the present disclosure will be thorough and complete, and will fully convey the concept of example embodiments to those skilled in the art. The same reference numerals in the drawings denote the same or similar structures, and thus their repeated descriptions will be omitted.

The features, structures, or characteristics described in the present disclosure may be combined in any suitable manner in one or more embodiments. In the following description, many specific details are provided to provide a full understanding of the embodiments of the present disclosure. However, those skilled in the art will realize that the technical solution of the present disclosure can be practiced while omitting one or more specific details, or employing other methods, components, apparatuses, steps, etc. In other cases, the commonly known methods, apparatuses, implementations, or operations are not shown or described in detail to avoid blurring various aspects of the present disclosure.

The accompanying drawings are only schematic illustrations of the present disclosure, and the same reference numerals in the drawings represent the same or similar parts, so repeated descriptions of them will be omitted. Some block diagrams shown in the drawings do not necessarily correspond to physically or logically independent entities. These functional entities can be implemented in the form of a software, or in at least one hardware module or integrated circuit, or in different networks and/or processor apparatuses and/or microcontroller apparatuses.

In addition, in the description of the present disclosure, the terms "a", "one", "the", "said", and "at least one" are used to indicate the existence of at least one element or component. The terms "including", "comprising", and "having" are used to indicate an open inclusion and refer to the existence of additional elements or components in addition to the listed elements or components. The terms "first", "second", and "third" are only used as markers and are not limited to the number of the objects.

The non-volatile memory provided by the embodiment of the present disclosure will be described in detail below with reference to the accompanying drawings.

FIG. 1 is a schematic diagram of a non-volatile memory in an exemplary embodiment of the present disclosure.

As shown in FIG. 1, the non-volatile memory 100 provided by an embodiment of the present disclosure may include n dies (for example, die 1, die 2, . . . die n), where n is an integer greater than 1.

In an embodiment of the present disclosure, it is illustrated by taking the non-volatile memory 100 being a Flash (flash memory) as an example. However, the embodiments of the present disclosure are not limited to such a non-volatile memory of Flash, and any other non-volatile memory is feasible.

In an embodiment of the present disclosure, a die may be an unpackaged die (bare die) or a chip, and the non-volatile memory 100 may include n dies, and the n dies may be packaged together in a stacked packaging manner.

At least one die of the n dies respectively receives a CRC (Cyclic Redundancy Check) operation execution instruction, and determines data to be verified of the at least one die according to the CRC operation execution instruction.

In an embodiment of the present disclosure, the CRC operation execution instruction refers to an instruction sent by an external device or a main control chip to enable the at least one die in the non-volatile memory to perform CRC calculation. The data to be verified of the die can be partial or all data stored in the die.

In an embodiment of the present disclosure, it may be that one die of the n dies (for example, die 2) receives the CRC operation execution instruction, and determines the data to be verified of the one die (for example, die 2) according to the CRC operation execution instruction. It may also be that partial dies in the n dies respectively receive the CRC operation execution instruction, and determine the data to be verified of each die in the partial dies according to the CRC operation execution instruction. It may also be that the n dies respectively receive the CRC operation execution instruction, and determine the data to be verified of each die in the n dies according to the CRC operation execution instruction (for example, die 1 determines the data to be verified of die 1, die 2 determines the data to be verified of die 2, . . . and die n determines the data to be verified of die n).

It can be understood that the embodiments of the present disclosure do not limit the number of dies that receive the CRC operation execution instruction, nor do limit the number of dies that need to determine the data to be verified. Those skilled in the art can set the dies that receive the CRC operation execution instruction according to actual situations.

In an exemplary embodiment, at least one die of the n dies may receive address information of the data to be verified of the non-volatile memory, and determine respective data to be verified of the at least one die according to the address information.

Specifically, at least one die of the n dies can simultaneously receive the CRC operation execution instruction and the address information of the data to be verified of the non-volatile memory, and the address information can be an address range including a start address and an end address of the data to be verified of the non-volatile memory. The at least one die of the n dies can determine the data to be verified stored at a corresponding address in each die according to the address information of the data to be verified.

For any die of the n dies, the die calculates a CRC code according to the data to be verified of the at least one die, to verify the data to be verified of the non-volatile memory.

In an embodiment of the present disclosure, the data to be verified of the non-volatile memory may include the above-mentioned data to be verified of the at least one die.

In an embodiment of the present disclosure, the die that determines the data to be verified and the die that calculates the CRC code can be the same die, or can be different dies. For example, after die 2 determines the data to be verified of die 2 according to the CRC operation execution instruction, die 2 can calculate the CRC code according to the data to be verified of the die 2; it can also be that the data to be verified of die 2 is sent to other dies, and other dies calculate the CRC code according to the data to be verified of die 2.

In an embodiment of the present disclosure, any die of the n dies can calculate the CRC code according to the data to be verified of the at least one die, and when receiving a CRC code reading instruction sent by an external device, return the calculated CRC code to the external device. The external device verifies the data to be verified according to the CRC code.

The non-volatile memory provided by the embodiment of the present disclosure includes n dies. When receiving a CRC operation execution instruction, at least one die of the n dies can determine the data to be verified stored in each die according to the CRC operation execution instruction. For any die of the n dies, the die can calculate the CRC code according to the determined data to be verified stored in each die. The CRC code can be used to verify the data stored in the non-volatile memory including a plurality of dies.

Figure 2:
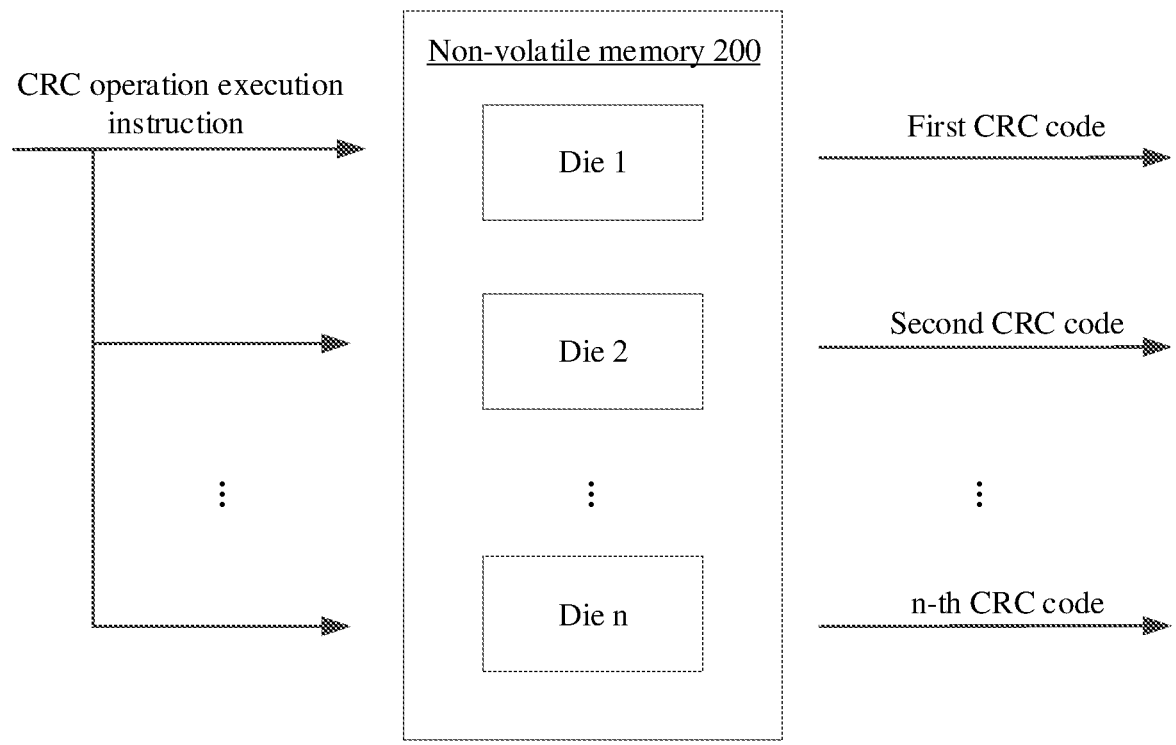
FIG. 2 is a schematic diagram of a non-volatile memory in another exemplary embodiment of the present disclosure.

FIG. 2 is a schematic diagram of a non-volatile memory in another exemplary embodiment of the present disclosure.

As shown in FIG. 2, the non-volatile memory 200 provided by the embodiment of the present disclosure may include n stacked packaged dies (for example, die 1, die 2, . . . die n), where n is an integer greater than 1. The n dies can interact with other chips or external devices through a same set of ports. Each die can respectively calculate a CRC code based on its respective data to be verified.

At least one die of the n dies can respectively receive the CRC operation execution instruction, and determine the data to be verified of the at least one die according to the CRC operation execution instruction. The at least one die of the n dies can also respectively receive address information of the data to be verified of the non-volatile memory, and determine the data to be verified of the at least one die according to the CRC operation execution instruction and the address information.

In the embodiment of FIG. 2, it is illustrated by taking n dies receiving the CRC operation execution instruction as an example, but the present disclosure is not limited to this.

For example, the address information of the data to be verified of the non-volatile memory includes a start address and an end address, where the start address includes the start address of die 1, and the end address includes the end address of die n.

In an exemplary embodiment, for any die of the n dies, the die calculates and stores the CRC code of the die according to the data to be verified of the die, to verify the data to be verified of the die.

For example, each die can include a CRC calculation unit. CRC calculation unit 1 of die 1 determines the data to be verified of die 1 according to the CRC operation execution instruction and the address range, calculates the CRC code of die 1 (for example, represented by the first CRC code) according to the data to be verified of die 1, and stores it in the register of CRC calculation unit 1 of die 1. The first CRC code can be used to verify whether the data to be verified of die 1 is right or wrong. CRC calculation unit 2 of die 2 determines the data to be verified of die 2 according to the CRC operation execution instruction and the address range, calculates the CRC code of die 2 (for example, represented by the second CRC code) according to the data to be verified of die 2, and stores it in the register of CRC calculation unit 2 of the die 2. The second CRC code can be used to verify whether the data to be verified of die 2 is right or wrong . . . . CRC calculation unit n of die n determines the data to be verified of die n according to the CRC operation execution instruction and the address range, calculates the CRC code of die n (for example, represented by the n-th CRC code) according to the data to be verified of die n, and stores it in the register of CRC calculation unit n of die n. The n-th CRC code can be used to verify whether the data to be verified of die n is right or wrong.

In an exemplary embodiment, for any die in the n dies, the die receives a CRC code reading instruction sent by an external device, and returns the CRC code of the die to the external device, to enable the external device to check the data to be verified of the die.

In an embodiment of the present disclosure, when the external device (or main control chip) needs to read any one or more groups of CRC codes from die 1 to die n, it can send a CRC code reading instruction to partial or all dies in die 1 to die n. The die that receives the instruction returns the CRC code of the die to the external device, and the external device verifies the data to be verified of the die according to the CRC code returned by the die.

For example, the external device sends a CRC code reading instruction to die i (where i is an integer greater than or equal to 1 and less than or equal to n). Die i returns the i-th CRC code to the external device after receiving the CRC code reading instruction. The external device determines whether the data stored in die i is right or wrong according to the i-th CRC code.

Specifically, the external device can calculate a i-th target CRC code according to the data stored in die i, and compare the i-th target CRC code with the i-th CRC code returned by die i. If the i-th target CRC code is consistent with the i-th CRC code returned by die i, the data stored in die i is correct.

The non-volatile memory provided by the embodiment of the present disclosure includes n dies. For any die in the n dies, the die calculates and stores the CRC code of the die according to the data to be verified of the die. When receiving the CRC code reading instruction sent by the external device, the die returns the CRC code of the die to the external device. The CRC code of the die can enable the external device to check the data to be verified of the die, thus determining the correctness of the data stored in each die in the non-volatile memory.

Figure 3:
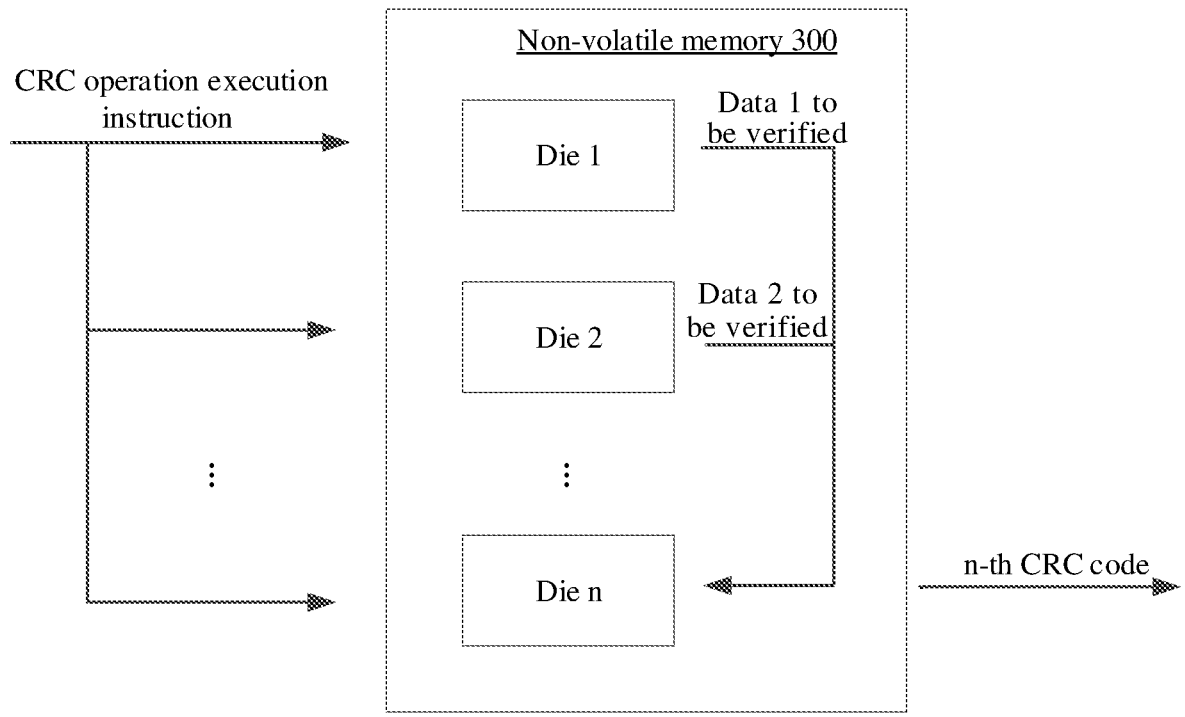
FIG. 3 is a schematic diagram of a non-volatile memory in yet another exemplary embodiment of the present disclosure.
Figure 4:
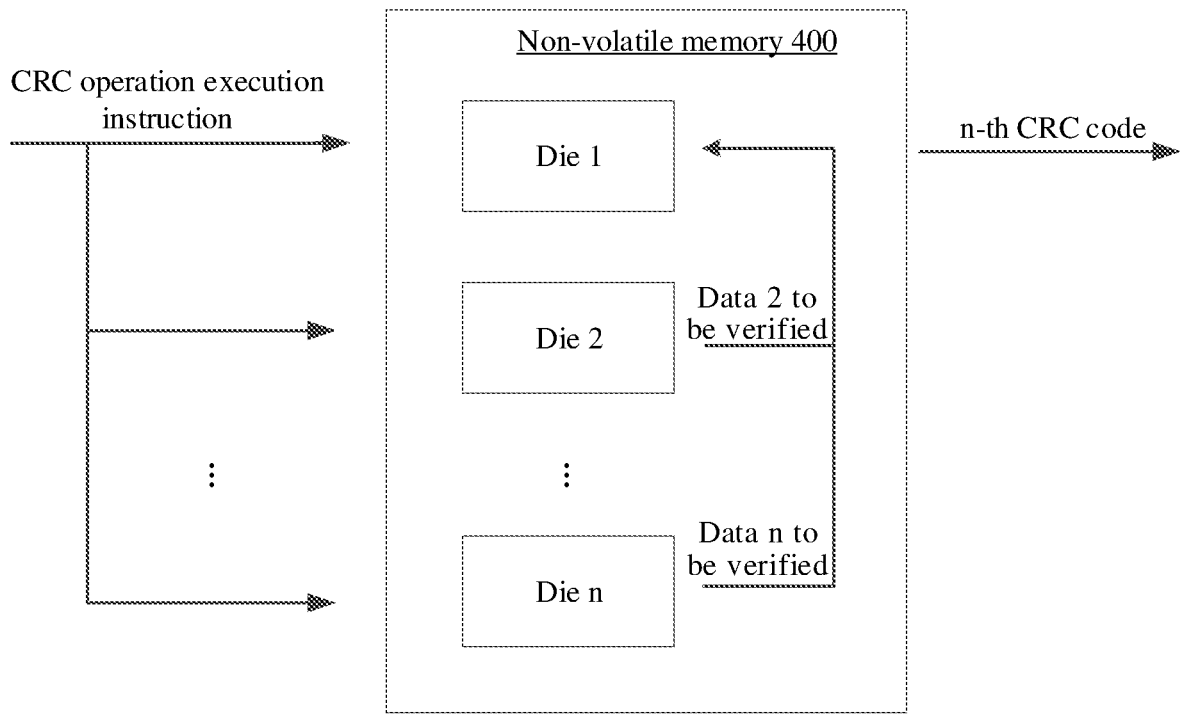
FIG. 4 is a schematic diagram of a non-volatile memory in yet another exemplary embodiment of the present disclosure.

FIG. 3 is a schematic diagram of a non-volatile memory in yet another exemplary embodiment of the present disclosure, and FIG. 4 is a schematic diagram of a non-volatile memory in yet another exemplary embodiment of the present disclosure.

The non-volatile memory provided by the embodiment of the present disclosure may include n stacked packaged dies (for example, die 1, die 2, . . . die n). One die of the n dies may be used as a target die, and dies except for the target die may be used as other dies. Other dies can be one or more dies.

In the non-volatile memory 300 shown in FIG. 3, die n is used as the target die. In the non-volatile memory 400 shown in FIG. 4, die 1 is used as the target die. However, the present disclosure is not limited to this. Those skilled in the art may determine any die of the n dies as the target die according to actual situations.

After at least one die in the n dies determines the data to be verified of the at least one die according to the CRC operation execution instruction, at least one other die in the n dies except for the target die can send respective data to be verified to the target die. The target die receives the data to be verified of each other die sent by the at least one other die, calculates the CRC code according to the data to be verified of each other die and the data to be verified of the target die, and stores it in the target die. The CRC code is used to verify the above-mentioned data to be verified.

For example, as shown in FIG. 3, after determining data 1 to be verified of die 1, die 1 sends the data 1 to be verified to die n. After determining data 2 to be verified of die 2, die 2 sends data 2 to be verified to die n . . . . Die n receives the data to be verified sent by the above-mentioned die, calculates the CRC code according to the received data to be verified and data n to be verified of die n, and stores it in die n.

Similarly, as shown in FIG. 4, after determining data 2 to be verified of die 2, die 2 sends data 2 to be verified to die 1 . . . . After determining data n to be verified of die n, die n sends data n to be verified to die 1. Die 1 receives the data to be verified sent by the above-mentioned die, calculates the CRC code according to the received data to be verified and data 1 to be verified of die 1, and stores it in die 1.

In an exemplary embodiment, the target die sequentially receives the data to be verified sent by the at least one other die, and sequentially calculates and stores the CRC code according to the data to be verified received each time, to verify the data to be verified of the non-volatile memory.

In an embodiment of the present disclosure, at least one other die can sequentially send its respective data to be verified to the target die. The target die sequentially receives the data to be verified of each other die, calculates the CRC code sequentially according to the data to be verified received each time, and overwrites the CRC code obtained by previous calculation using the CRC code obtained by each calculation.

Among them, the target die may sequentially receive the data to be verified of each other die according to the sequence of the address information corresponding to the data to be verified of each other die.

Specifically, the target die can calculate the first CRC code according to the data to be verified of the first storage chip, calculate the i-th CRC code according to the (i−1)-th CRC code and the data to be verified of the i-th storage chip, where i is an integer greater than 1 and less than n, and calculate and store the n-th CRC code according to the (n−1)-th CRC code and the data to be verified of the n-th storage chip, to verify the data to be verified of the non-volatile memory.

For example, as shown in FIG. 3, die 1 sends data 1 to be verified to die n. Die n calculates the first CRC code according to data 1 to be verified, and stores it in die n. Then, die 2 sends data 2 to be verified to die n. Die n calculates the second CRC code according to data 2 to be verified and the first CRC code obtained by previous calculation, and stores it in die n (for example, using the second CRC code to overwrite the first CRC code) . . . . Die n calculates the n-th CRC code according to data n to be verified of die n and the (n−1)-th CRC code obtained by previous calculation, and stores it in die n.

Similarly, as shown in FIG. 4, die 1 calculates the first CRC code according to data 1 to be verified of die 1, and stores it in die 1. Then, die 2 sends data 2 to be verified to die 1. Die 1 calculates the second CRC code according to data 2 to be verified and the first CRC code obtained previously, and stores it in die 1 (for example, using the second CRC code to overwrite the first CRC code) . . . . After that, die n sends data n to be verified to die 1. Die 1 calculates the n-th CRC code according to data n to be verified and the (n−1)-th CRC code obtained by previous calculation, and stores it in die 1.

In an embodiment of the present disclosure, the existing PAD of the non-volatile memory can be reused to perform data exchange between the above dies.

In an exemplary embodiment, the target die receives the CRC code reading instruction sent by the external device, and returns the CRC code last stored by the target die to the external device, to enable the external device to check the data to be verified of the non-volatile memory.

In an embodiment of the present disclosure, when the external device (or main control die) needs to read the CRC code of the non-volatile memory, it can send the CRC code reading instruction to the target die. The target die returns the CRC code last stored by the target die (for example, the n-th CRC code) to the external device. The external device verifies the data to be verified of the non-volatile memory according to the CRC code returned by the target die.

The non-volatile memory provided by the embodiment of the present disclosure includes n dies. The target die sequentially receives the data to be verified sent by at least one other die, and calculates and stores the CRC code sequentially according to the data to be verified received each time. When receiving the CRC code reading instruction sent by the external device, the target die returns the last stored CRC code to the external device. The CRC code can be used to verify the data stored in the non-volatile memory including a plurality of dies, thus improving the correctness of the data stored in the non-volatile memory.

Figure 5:
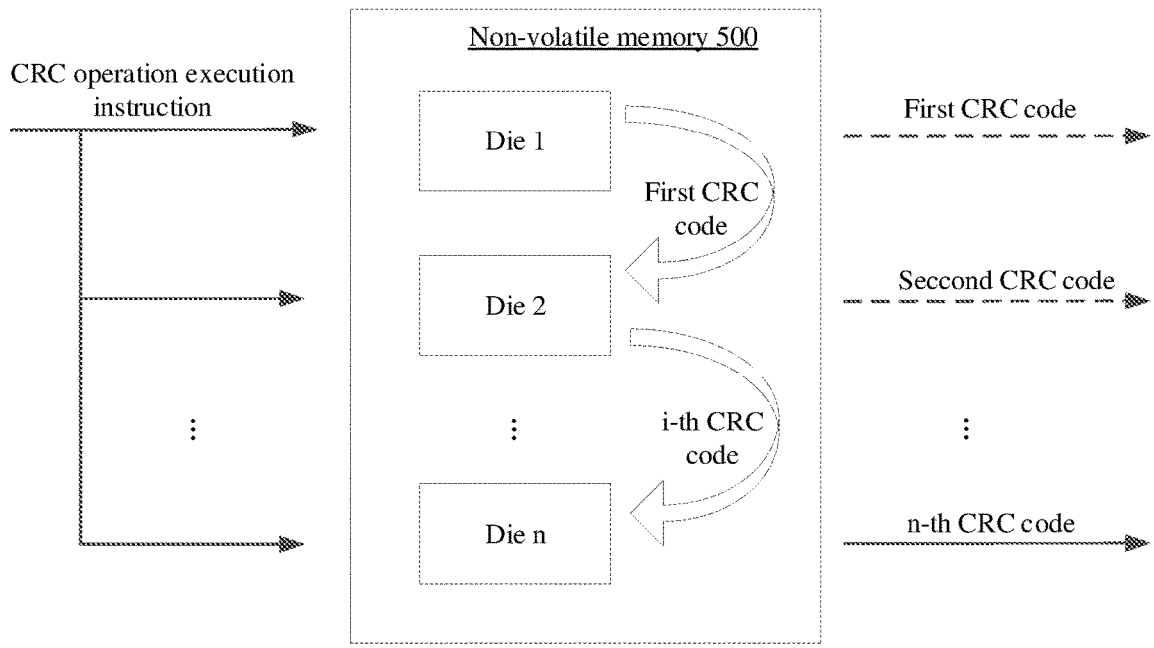
FIG. 5 is a schematic diagram of a non-volatile memory in yet another exemplary embodiment of the present disclosure.

FIG. 5 is a schematic diagram of a non-volatile memory in yet another exemplary embodiment of the present disclosure.

As shown in FIG. 5, the non-volatile memory 500 provided by the embodiment of the present disclosure may include n stacked packaged dies (for example, die 1, die 2, . . . die n), where n is an integer greater than 1. The n dies can interact with other chips or external devices through a same set of ports.

At least one die of the n dies can respectively receive the CRC operation execution instruction, and determine the data to be verified of the at least one die according to the CRC operation execution instruction. Several dies of the n dies calculate and store the CRC codes sequentially according to their respective data to be verified, to verify the data to be verified of each die.

In an exemplary embodiment, for any die of the several dies, the die receives the CRC code stored by the previous die, and calculates and stores the CRC code of the die according to the data to be verified of the die and the CRC code stored by the previous die, to verify the data to be verified of the die.

It can be understood that the above-mentioned several dies of then dies refers to partial or all dies in the n dies. In the following, it is illustrated by taking that all dies in the n dies calculate the CRC codes according to their respective data to be verified as an example. However, the present disclosure is not limited to this.

Specifically, the first die calculates and stores the first CRC code according to the data to be verified of the first die, and sends the first CRC code to the second die. The i-th die receives the (i−1)-th CRC code, calculates and stores the i-th CRC code according to the (i−1)-th CRC code and the data to be verified of the i-th die, and sends the i-th CRC code to the (i+1)-th die, where i is an integer greater than 1 and less than N. The n-th die receives the (n−1)-th CRC code, and calculates and stores the n-th CRC code according to the (n−1)-th CRC code and the data to be verified of the n-th die, to verify the data to be verified of each die.

For example, as shown in FIG. 5, die 1 calculates the first CRC code according to data 1 to be verified of die 1, stores the first CRC code in die 1, and sends the first CRC code to die 2. Die 2 calculates the second CRC code according to the first CRC code and data 2 to be verified of die 2, stores the second CRC code in die 2, and sends the second CRC code to die 3 . . . . Die n calculates the n-th CRC code based on the (n−1)-th CRC code and data n to be verified of die n, and stores it in die n.

In an exemplary embodiment, any die in the several dies receives the CRC code reading instruction sent by the external device, and returns the CRC code of the die to the external device, to enable the external device to check the data to be verified of the non-volatile memory.

Specifically, the n-th die receives the CRC code reading instruction sent by the external device, and returns the n-th CRC code to the external device, to enable the external device to check the data to be verified of the non-volatile memory according to the n-th CRC code. If the verification that the external device verifies the data to be verified of the non-volatile memory according to the n-th CRC code passes, it means that the data stored in the non-volatile memory is correct. If the verification that the external device verifies the data to be verified of the non-volatile memory according to the n-th CRC code fails to pass, it means that the data stored in the non-volatile memory is wrong.

In the case that the data stored in the non-volatile memory is wrong, the external device can send the CRC code reading instruction to the first die. The first die receives the CRC code reading instruction sent by the external device and returns the first CRC code to the external device, to enable the external device to check the data to be verified of the first die according to the first CRC code. If the verification that the external device verifies the data to be verified of the first die according to the first CRC code fails to pass, it means that the data stored in the first die is wrong. If the verification that the external device verifies the data to be verified of the first die according to the first CRC code passes, it means that the data stored in the first die is correct. Then, the external device continues to send the CRC code reading instruction to the second die, to verify the data to be verified of the second die according to the second CRC code returned by the second die, and so on, until it is determined that there is a defective die.

The non-volatile memory provided by the embodiment of the present disclosure includes n dies. Several dies in the n dies calculate and store the CRC code according to their respective data to be verified sequentially. For any die in the several dies, the die receives the CRC code stored by the previous die, and calculates and stores the CRC code of the die according to the data to be verified of the die and the CRC code stored by the previous die. Any die in the several dies receives the CRC code reading instruction sent by the external device and returns the CRC code of the die to the external device. Among them, the CRC code corresponding to the n-th die can be used to verify the data stored as a whole in the non-volatile memory, and the CRC codes corresponding to other dies can be further used to verify the data stored in each die.

In an embodiment of the present disclosure, the IO ports of the non-volatile memory can be used for interaction of instructions/codes/data, etc. The non-IO ports can be used to control or reflect the working status of the die.

In an exemplary embodiment, at least one non-IO port of the non-volatile memory is used to transmit a status signal. When the status signal is at a first level, it indicates that at least one die is performing CRC calculation.

In an exemplary embodiment, at least one non-IO port of the non-volatile memory is used to transmit a control signal. when the control signal is at a first level, it indicates that at least one die is performing CRC calculation.

Among them, the first level may be a high level, or may be a low level, which is not limited in the present disclosure.

For example, the first level may be the level opposite to the default status of the non-IO port, or the first level may be the level opposite to the level status of the non-IO port when the IO ports are active.

Figure 6:
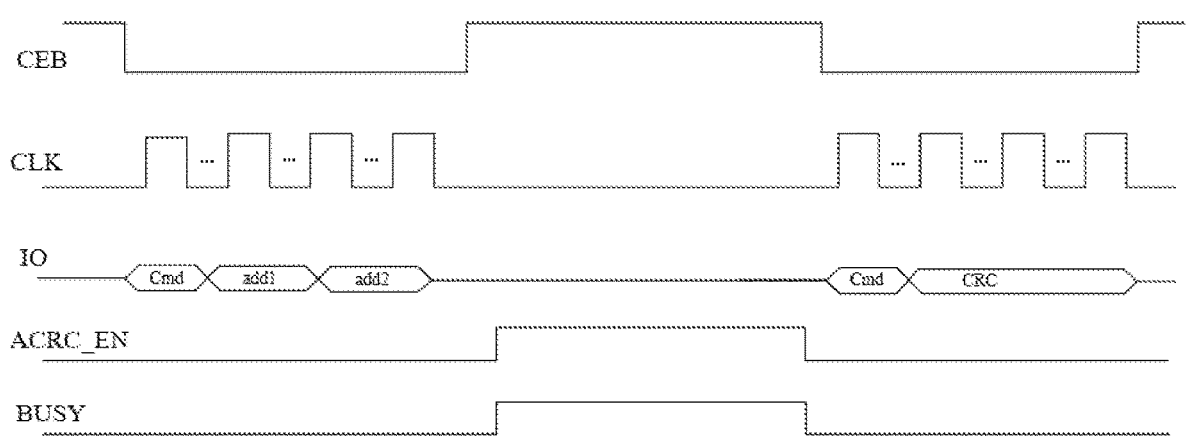
FIG. 6 shows a timing diagram of status signals and control signals corresponding to the non-volatile memory provided by the embodiment of the present disclosure.

FIG. 6 shows a timing diagram of status signals and control signals corresponding to the non-volatile memory provided by the embodiment of the present disclosure.

As shown in FIG. 6, CLK represents the clock signal, IO represents the input and output signals, the control signal can be CEB (chip enable) enable signal or ACRC_EN enable signal. When CEB enable signal or ACRC_EN enable signal is at a high level, it means that the die is performing CRC calculation. The status signal can be a BUSY signal. When the BUSY signal is at a high level, it means that the die is performing CRC calculation.

In an exemplary embodiment, after at least one die of the n dies receives the address information of the data to be verified of the non-volatile memory, the at least one die determines whether the start address and the end address in the address information are both located on the same die. If the start address and the end address are not located on the same die, a flag signal is generated to prompt that an address in the address information overflows.

Referring to FIG. 1 to FIG. 5, for example, after die 2 receives the address information of the data to be verified of the non-volatile memory, die 2 determines whether the start address and the end address in the address information are both located on die 2. If die 2 determines that the start address and the end address in the address information are not both located on die 2, a flag signal representing address overflow may be generated, where the flag signal may be a signal for reporting error.

In an exemplary embodiment, at least one die reports the flag signal to the external device, to prompt the external device that the address in the address information overflows.

Continuing to refer to FIG. 1 to FIG. 5, for example, die 2 reports the flag signal representing address overflow to the external device, and prompts the external device that an address in the address information of the data to be verified overflows.

Figure 7:
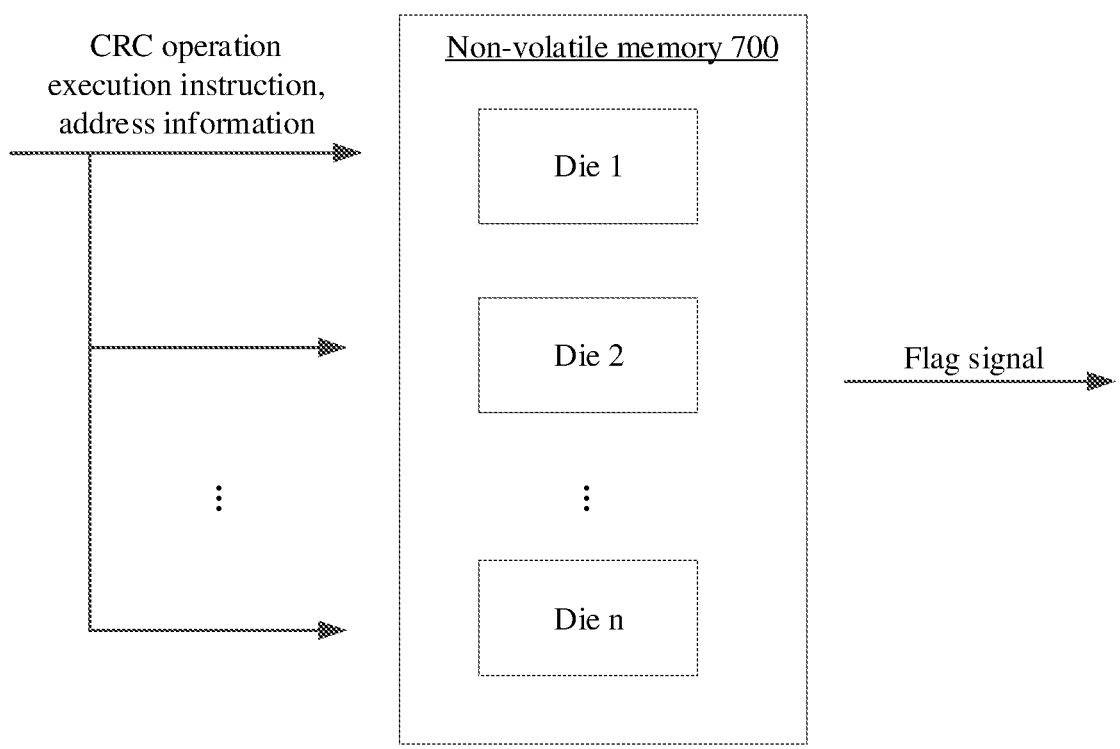
FIG. 7 is a schematic diagram of a non-volatile memory in yet another exemplary embodiment of the present disclosure.

FIG. 7 is a schematic diagram of a non-volatile memory in yet another exemplary embodiment of the present disclosure.

As shown in FIG. 7, the non-volatile memory 700 provided by the embodiment of the present disclosure may include n dies (for example, die 1, die 2, . . . , die n), where n is an integer greater than 1.

At least one die of the n dies receives the CRC operation execution instruction and the address information of the data to be verified of the non-volatile memory, and determines whether the start address and the end address in the address information are both located on the same die. If the start address and the end address are not both located on the same die, a flag signal is generated to prompt that an address in the address information overflows.

Referring to FIG. 7, for example, after die 2 receives the address information of the data to be verified of the non-volatile memory, die 2 determines whether the start address and the end address in the address information are both located on die 2. If die 2 determines that the start address and the end address in the address information are not both located on die 2, a flag signal representing address overflow can be generated, where the flag signal can be a signal for reporting error.

In an exemplary embodiment, at least one die reports the flag signal to the external device, to prompt the external device that the address in the address information overflows.

Continuing to refer to FIG. 7, for example, the die 2 reports the flag signal representing address overflow to the external device, to prompt the external device that an address in the address information of the data to be verified overflows.

Embodiments of the present disclosure further provide an electronic device, which includes the non-volatile memory as described in any one of the above embodiments. The electronic device can be any terminal device and/or server, and the terminal device can be any one or more of mobile phones, tablet computers, desktop computers, notebook computers, game consoles, television s, on-board terminals, wearable smart devices, etc.

According to the present disclosure, there is provided a non-volatile memory and an electronic device, which can verify the data stored in the non-volatile memory including a plurality of dies, thus improving the correctness of the data stored in the non-volatile memory.

According to an embodiment of the present disclosure, there is provided a non-volatile memory, including n dies, n is an integer greater than 1; at least one die of the n dies respectively receives a CRC operation execution instruction, and determines data to be verified of the at least one die according to the CRC operation execution instruction; for any die of the n dies, the die calculates a CRC code according to the data to be verified of the at least one die, to verify data to be verified of the non-volatile memory.

In some exemplary embodiments of the present disclosure, for any die of the n dies, the die calculates and stores a CRC code of the die according to data to be verified of the die, to verify the data to be verified of the die.

In some exemplary embodiments of the present disclosure, for any die of the n dies, the die receives a CRC code reading instruction sent by an external device, and returns the CRC code of the die back to the external device, to enable the external device to check the data to be verified of the die.

In some exemplary embodiments of the present disclosure, the n dies include a target die and a plurality of other dies except for the target die; the target die receives data to be verified sent by the at least one other die; the target die calculates and stores a CRC code according to the data to be verified of the at least one other die, to verify the data to be verified of the non-volatile memory.

In some exemplary embodiments of the present disclosure, the target die sequentially receives the data to be verified sent by the at least one other die, and sequentially calculates and stores a CRC code according to data to be verified received each time, to verify the data to be verified of the non-volatile memory.

In some exemplary embodiments of the present disclosure, the target die receives a CRC code reading instruction sent by an external device, and returns a CRC code last stored by the target die to the external device, to enable the external device to check the data to be verified of the non-volatile memory.

In some exemplary embodiments of the present disclosure, several dies of the n dies calculate and store CRC codes sequentially according to respective data to be verified, to verify data to be verified of each die.

In some exemplary embodiments of the present disclosure, for any die of the several dies, the die receives a CRC code stored by a previous die, and calculates and stores a CRC code of the die according to data to be verified of the die and the CRC code stored by the previous die, to verify the data to be verified of the die.

In some exemplary embodiments of the present disclosure, any die of the several dies receives a CRC code reading instruction sent by an external device, and returns the CRC code of the die to the external device, to enable the external device to check the data to be verified of the non-volatile memory.

In some exemplary embodiments of the present disclosure, at least one non-IO port of the non-volatile memory is used to transmit a status signal, and the status signal being at a first level indicates that at least one die is performing CRC calculation.

In some exemplary embodiments of the present disclosure, at least one non-IO port of the non-volatile memory is used to transmit a control signal, and the control signal being at a first level indicates that at least one die is performing CRC calculation.

In some exemplary embodiments of the present disclosure, the at least one die of the n dies receives address information of the data to be verified of the non-volatile memory, and determines respective data to be verified of the at least one die according to the address information.

In some exemplary embodiments of the present disclosure, the at least one die determines whether a start address and an end address in the address information are both located on a same die; if the start address and the end address are not both located on the same die, a flag signal is generated to prompt that an address in the address information overflows.

In some exemplary embodiments of the present disclosure, the at least one die reports the flag signal to an external device to prompt the external device that the address in the address information overflows.

According to an embodiment of the present disclosure, there is provided a non-volatile memory, including n dies, where n is an integer greater than 1; at least one die of the n dies receives a CRC operation execution instruction and address information of data to be verified of the non-volatile memory, and determines whether a start address and an end address in the address information are both located on a same die; if the start address and the end address are not both located on the same die, a flag signal is generated to prompt that an address in the address information overflows.

In some exemplary embodiments of the present disclosure, the at least one die reports the flag signal to an external device to prompt the external device that the address in the address information overflows.

According to an embodiment of the present disclosure, there is provided an electronic device, including any one of the non-volatile memories described above.

The non-volatile memory provided by the embodiment of the present disclosure includes n dies. When receiving CRC operation execution instruction, at least one die of the n dies can determine data to be verified stored in each die according to the CRC operation execution instruction. For any die of the n dies, the die can calculate a CRC code according to the determined data to be verified stored in each die. The CRC code can be used to verify the data stored in the non-volatile memory including a plurality of dies, thus improving the correctness of the data stored in the non-volatile memory.

It should be noted that the drawings are only a schematic explanation of the processing included in the method according to the exemplary embodiments of the present disclosure, and not for a limiting purpose. It is easy to understand that the processes shown in the drawings do not indicate or limit the time sequence of these processes. In addition, it is also easy to understand that these processes can be, for example, executed synchronously or asynchronously across a plurality of modules.

It should be understood that the number of elements in the accompanying drawings of the present disclosure is used as an example rather than a limitation, and any naming is only used to distinguish and does not have any restrictive meaning.

Those skilled in the art will easily come up with other embodiments of the present disclosure after considering the specification and practicing the invention disclosed here. The present disclosure intends to cover any variations, uses, or adaptive changes of the present disclosure, which follow the general principles of the present disclosure and include common knowledge or conventional technical means in the technical field that are not disclosed in the present disclosure. The specification and embodiments are only considered exemplary, and the true scope and spirit of the present disclosure are indicated by the following claims.

It should be understood that the present disclosure is not limited to the precise structure already described above and shown in the accompanying drawings, and various modifications and changes can be made without departing from its scope. The scope of the present disclosure is limited only by the appended claims.

What is claimed is:

1. A non-volatile memory, comprising n dies, wherein n is an integer greater than 1;
   at least one die of the n dies respectively receives a CRC operation execution instruction, and determines data to be verified of the at least one die according to the CRC operation execution instruction;
   for any die of the n dies, the die calculates a CRC code according to the data to be verified of the at least one die, to verify data to be verified of the non-volatile memory; and
   wherein the n dies include a target die and a plurality of other dies except for the target die, and the target die sequentially receives the data to be verified sent by the at least one other die according to a sequence of address information corresponding to the data to be verified of each other die, and sequentially calculates and stores a CRC code according to data to be verified received each time, to verify the data to be verified of the non-volatile memory.

2. The non-volatile memory according to claim 1, wherein, for any die of the n dies, the die calculates and stores a CRC code of the die according to data to be verified of the die, to verify the data to be verified of the die.

3. The non-volatile memory according to claim 2, wherein, for any die of the n dies, the die receives a CRC code reading instruction sent by an external device, and returns the CRC code of the die back to the external device, to enable the external device to check the data to be verified of the die.

4. The non-volatile memory according to claim 1, wherein the target die receives a CRC code reading instruction sent by an external device, and returns a CRC code last stored by the target die to the external device, to enable the external device to check the data to be verified of the non-volatile memory.

5. The non-volatile memory according to claim 1, wherein, several dies of the n dies calculate and store CRC codes sequentially according to respective data to be verified, to verify data to be verified of each die.

6. The non-volatile memory according to claim 5, wherein, for any die of the several dies, the die receives a CRC code stored by a previous die, and calculates and stores a CRC code of the die according to data to be verified of the die and the CRC code stored by the previous die, to verify the data to be verified of the die.

7. The non-volatile memory according to claim 6, wherein, any die of the several dies receives a CRC code reading instruction sent by an external device, and returns the CRC code of the die to the external device, to enable the external device to check the data to be verified of the non-volatile memory.

8. The non-volatile memory according to claim 1, wherein at least one non-IO port of the non-volatile memory is used to transmit at least one of:
- a status signal, the status signal being at a first level indicates that at least one die is performing CRC calculation; or
- a control signal, the control signal being at a first level indicates that at least one die is performing CRC calculation.

9. The non-volatile memory according to claim 1, wherein the at least one die of the n dies receives address information of the data to be verified of the non-volatile memory, and determines respective data to be verified of the at least one die according to the address information.

10. The non-volatile memory according to claim 9, wherein
the at least one die determines whether a start address and an end address in the address information are both located on a same die; and
if the start address and the end address are not both located on the same die, a flag signal is generated to prompt that an address in the address information overflows.

11. The non-volatile memory according to claim 10, wherein the at least one die reports the flag signal to an external device to prompt the external device that the address in the address information overflows.

12. A non-volatile memory, comprising n dies, where n is an integer greater than 1;
at least one die of the n dies receives a CRC operation execution instruction and address information of data to be verified of the non-volatile memory, and determines whether a start address and an end address in the address information are both located on a same die;
if the start address and the end address are not both located on the same die, a flag signal is generated to prompt that an address in the address information overflows; and
include memory wherein the n dies include a target die and a plurality of other dies except for the target die, and the target due sequentially receives the data to be verified sent by the at least one other die according to a sequence of address information corresponding to the data to be verified of each other die, and sequentially calculates and stores a CRC code according to data to be verified received each time, to verify the data to be verified of the non-volatile memory.

13. The non-volatile memory according to claim 12, wherein the at least one die reports the flag signal to an external device to prompt the external device that the address in the address information overflows.

14. An electronic device, comprising a non-volatile memory, wherein the non-volatile memory comprises n dies, and n is an integer greater than 1;
at least one die of the n dies respectively receives a CRC operation execution instruction, and determines data to be verified of the at least one die according to the CRC operation execution instruction;
for any die of the n dies, the die calculates a CRC code according to the data to be verified of the at least one die, to verify data to be verified of the non-volatile memory; and
wherein the n dies include a target die and a plurality of other dies except for the target die, and the target die sequentially receives the data to be verified sent by the at least one other die according to a sequence of address information corresponding to the data to be verified of each other die, and sequentially calculates and stores a CRC code according to data to be verified received each time, to verify the data to be verified on the non-volatile memory.

15. The electronic device according to claim 14, wherein, for any die of the n dies, the die calculates and stores a CRC code of the die according to data to be verified of the die, to verify the data to be verified of the die.

16. The electronic device according to claim 14, wherein several dies of the n dies calculate and store CRC codes sequentially according to respective data to be verified, to verify data to be verified of each die.

17. The electronic device according to claim 14, wherein at least one non-IO port of the non-volatile memory is used to transmit at least one of:
- a status signal, the status signal being at a first level indicates that at least one die is performing CRC calculation; or
- a control signal, the control signal being at a first level indicates that at least one die is performing CRC calculation.

* * * * *